July 25, 1961 K. L. FENDER ET AL 2,993,642

TAPE PRINTING AND PUNCHING MACHINE

Filed Sept. 19, 1958 3 Sheets-Sheet 1

INVENTORS
KEITH L. FENDER
PHILIP E. RENSHAW
MARION R. DILLING
BY: Mellin and Hanscom
ATTORNEYS

TAPE PRINTING AND PUNCHING MACHINE

Filed Sept. 19, 1958 3 Sheets-Sheet 2

INVENTORS
KEITH L. FENDER
PHILIP E. RENSHAW
MARION R. DILLING
BY: Mellin and Hanscom
ATTORNEYS INVENTORS
KEITH L. FENDER
PHILIP E. RENSHAW
MARION R. DILLING
BY: Mellin and Hanscom
ATTORNEYS

United States Patent Office 2,993,642
Patented July 25, 1961

2,993,642
TAPE PRINTING AND PUNCHING MACHINE

Keith L. Fender, Philip E. Renshaw, and Marion Ray Dilling, Seattle, Wash., assignors to Tally Register Corporation, Seattle, Wash., a corporation of Washington
Filed Sept. 19, 1958, Ser. No. 762,022
6 Claims. (Cl. 234—37)

This invention relates to machines for coding tape, and more particularly to a machine adapted to punch code holes in a tape and to simultaneously print a symbol on the tape having an indicia correspondence to the code represented by the punched holes.

Punched tapes are being widely used in industry for various purposes, as for conveying information into computing machines, or in the functioning of automatically operating machines. Such tapes are generally prepared for such use by translating digital or other bits of information into a binary representation thereof, and by punching coded holes through the tape to represent such a binary translation. The embodiment of this invention provides a machine for keyboard operation wherein manually operable keys are provided for each bit of information to be punched in the tape. The operation of any key will cause the binary translation of the key indicia to be punched in a tape. As a result, a tape will be produced having a plurality of groups of coded holes representing the bits of information coded thereon.

Oftentimes it is desirable to visually check the tape after it is finished, or after a bit of information has been entered thereon. If the operator is thoroughly familiar with the binary representation of such information, a quick inspection of the coded holes will inform him if the information has been correctly coded thereon. However, it is quite often the case that the operator is not familiar with such representation and it is necessary to spend much time in decoding the coded holes to see if they are correct. The present invention overcomes the problem by simultaneously printing a symbol on the tape adjacent each group of coded holes, with the symbol having an indicia correspondence to the code represented by that group of coded holes. Thus, to check the tape to see if it is correct, all that need be done is to read the printed symbols. If the printed symbols are correct, then the coded holes are correct.

As is apparent, the printed symbols can also be used at a later time to identify easily the coded contents of a tape.

Accordingly, the primary object of this invention is to provide a machine for punching a group of coded holes in a tape and for simultaneously printing a visual symbol of the code represented by the group of coded holes, with the printed symbol being adjacent the group of holes.

A further object of the invention is to provide a coded recess punch cylinder for use in a tape punching machine in which the code cylinder is provided with means to print a symbol on a tape corresponding to the code of the holes punched in the tape by the machine simultaneously with the punching of the tape.

Another object of the invention is to provide a tape punching machine with means operable as a keyboard to selectively punch a tape with a desired one of a plurality of different bits of information and in which a visual indication of the bit of information is simultaneously printed on the tape.

A further object of the invention is to provide a continuously rotatable code cylinder having a plurality of longitudinal rows of coded punch recesses into which punch members may enter and latch means operable by a plurality of manually operable keys for latching the code cylinder against rotation at different angular positions thereof in accordance with which key is operated.

Yet another object is to provide a means for advancing the tape a predetermined distance after a punching and printing operation on the tape.

Another object is to provide a control circuit for a tape punching machine including means for stopping entry of coded information onto a tape after a predetermined number of bits of information have been entered on the tape.

Other objects and advantages will become apparent in the course of the following detailed description.

In the drawings, forming a part of this application, and in which like parts are designated by like reference numerals throughout the same, FIG. 1 is a sectional view of an embodiment of the invention, with parts shown in elevation.

Figures 1, 6:
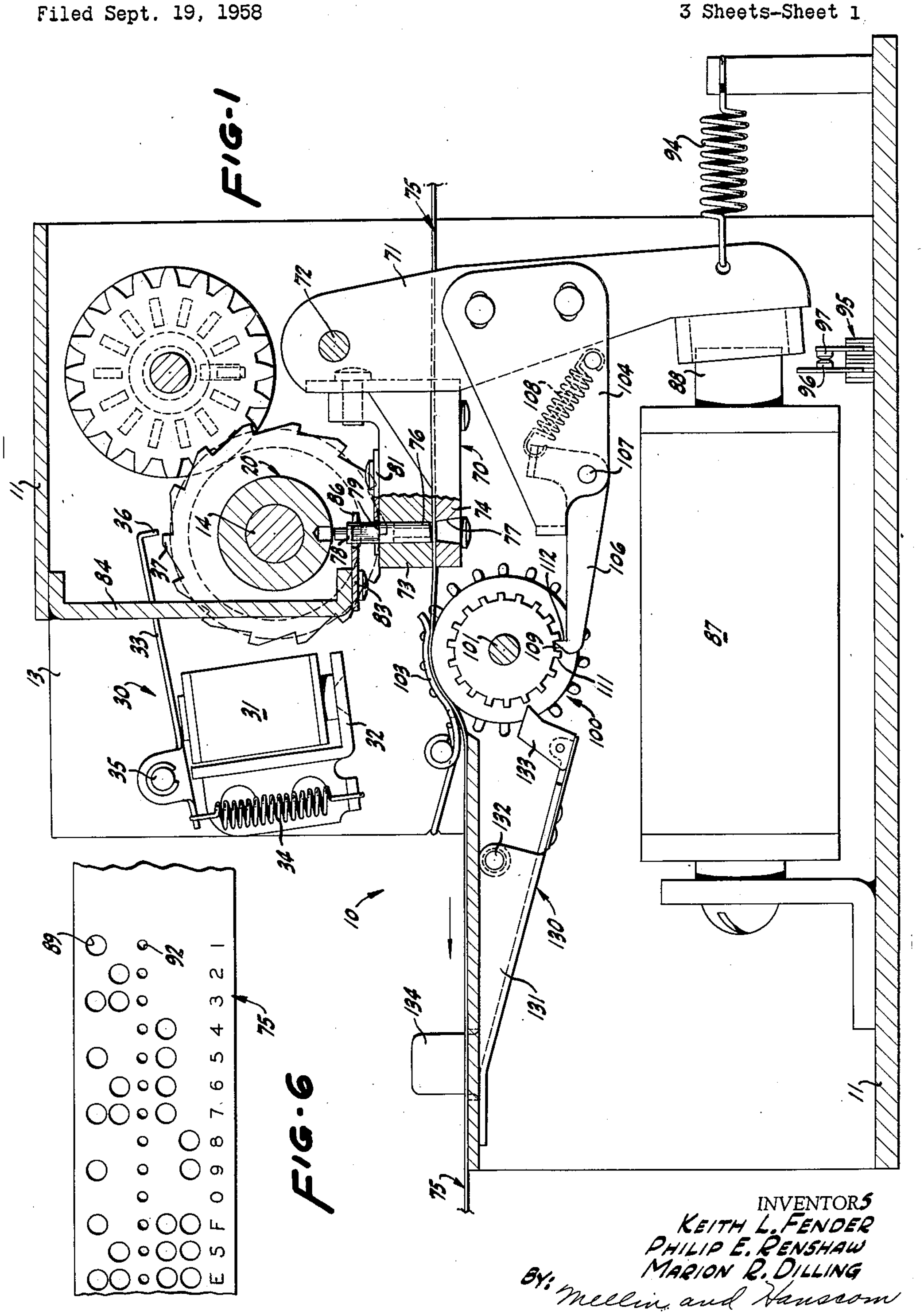
FIG. 6 is a plan view of a section of tape punched and printed by the embodiment of this invention.

Referring now to the drawings, the tape punching and printing machine, generally designated by the reference numeral 10, comprises a frame 11 having front and rear walls 12 and 13 in which shaft 14 is journaled for rotation in roller bearings 16. An electric motor 17 has a shaft 18 telescopically coupled to shaft 14 and keyed thereto by key 19 so that rotation of the motor shaft will cause rotation of shaft 14.

A code cylinder 20 is mounted coaxially on shaft 14 for free rotation thereon, and with forward axial movement thereon being prevented by the abutment with ring 21 on shaft 14. A similar ring 22 is mounted on shaft 14 behind the code cylinder and serves as an abutment for the resilient friction drive member 23 which is keyed for rotation with shaft 14 by key 24 lying within the shaft keyway 26. The friction drive member 23 presses against the coupled-together gear 27 and ratchet wheel 28 which are mounted on the code cylinder and restrained from rotation thereon by the cylinder key 29. Thus, by means of this arrangement, the code cylinder 20 is impositively friction driven by shaft 14 so as to normally rotate therewith. However, should the code cylinder be held stationary, the shaft 14 will still be able to rotate, and the friction drive member 23 will merely rub against gear 27 without imparting rotative movement thereto.

An electromagnetic latch member 30 is provided, as shown in FIG. 1, for latching the code cylinder against rotative movement on shaft 14, and comprises a magnet 31 carried by bracket 32 mounted on the rear wall 13. A pallet lever 33, normally biased away from the magnet by spring 34, is pivotally mounted at 35 on bracket 32, and, when attracted by the magnet, will pivot in a clockwise direction so that the hook 36 on its end will move downwardly into the path of movement of the ratchet teeth 37 on ratchet wheel 28. The next tooth 37 will then engage the pallet lever hook 36 to prevent further rotation of the code cylinder.

A printing wheel 40 is mounted on the front end of code cylinder 20, and is keyed for rotation therewith by key 41. The outer periphery of the printing wheel engages the felt pad 42 of the inking roller 43 mounted for free rotation on shaft 44, which in turn is mounted for rotation in roller bearings 46 disposed in the front and rear frame walls 12 and 13.

Gear 47, keyed to shaft 44, meshes with gear 27 carried by code cylinder 20 so that shaft 44 will be rotated by the rotation of the code cylinder. Gears 47 and 27 have the same number of teeth so that shaft 44 and code cylinder 20 will rotate at the same angular rate.

Figure 4:
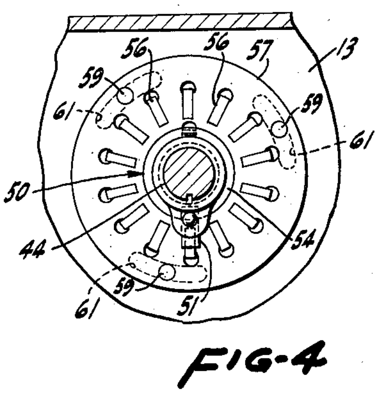
FIG. 4 is a sectional view, taken on line 4—4 of FIG. 2.
Figure 5:
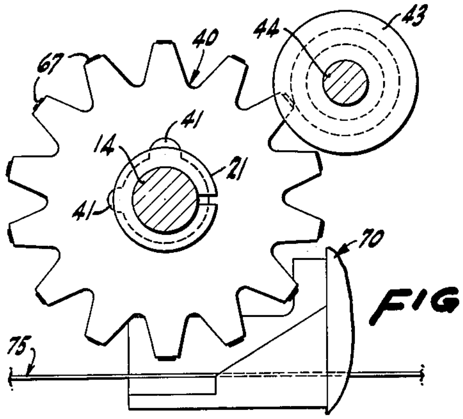
FIG. 5 is a sectional view, taken on line 5—5 of FIG. 2.

A brush carrier 50 is mounted on, and keyed for rotation with, shaft 44, and is provided with a brush 51 having two contacting points 52 and 53 engageable with the annular contact ring 54 and the individual contact segments 56 carried by the brush contact plate 57. Plate 57 is spaced from the back wall 13 by means of spacers 58 and is mounted thereto by screws 59. As is seen in FIG. 4, the screws 59 pass through arcuate slots 61 in the rear wall 13 so that some rotational adjustment of plate 57 may be made relative to the rear wall 13. Each of the contact segments 56 and contact ring are connected by lead wires 62 to a control circuit to be hereinafter described. As is apparent, whenever the code cylinder 20 is free to rotate with shaft 14, the brush carrier 50 will rotate relative to the brush contact plate 57, with the brush 51 sweeping across the contact segments 56 and connecting them electrically with the contact ring 54.

The code cylinder 20 has a plurality of longitudinal rows of coded punch recesses 66 on the outer surface thereof. In the disclosed embodiment there are fourteen rows of these punch recesses, spaced equidistantly around the periphery of the code cylinder, each row having a different number and positioning of these recesses to enable a tape to be code punched in a manner to be hereinafter described. The printing wheel 40 likewise has fourteen raised type or printing indicia 67 on the spoked periphery thereof, spaced equidistantly therearound. Each of the printing indicia 67 is in alignment with one of the rows of the coded punch recesses 66 and has an indicia correspondence to the code of that particular row of punch recesses. The brush contact plate 57 also is provided with fourteen separate contact segments 56 spaced equidistantly around the plate, and the ratchet wheel 28 has fourteen ratchet teeth 37 spaced equidistantly around the periphery thereof.

Figure 2:
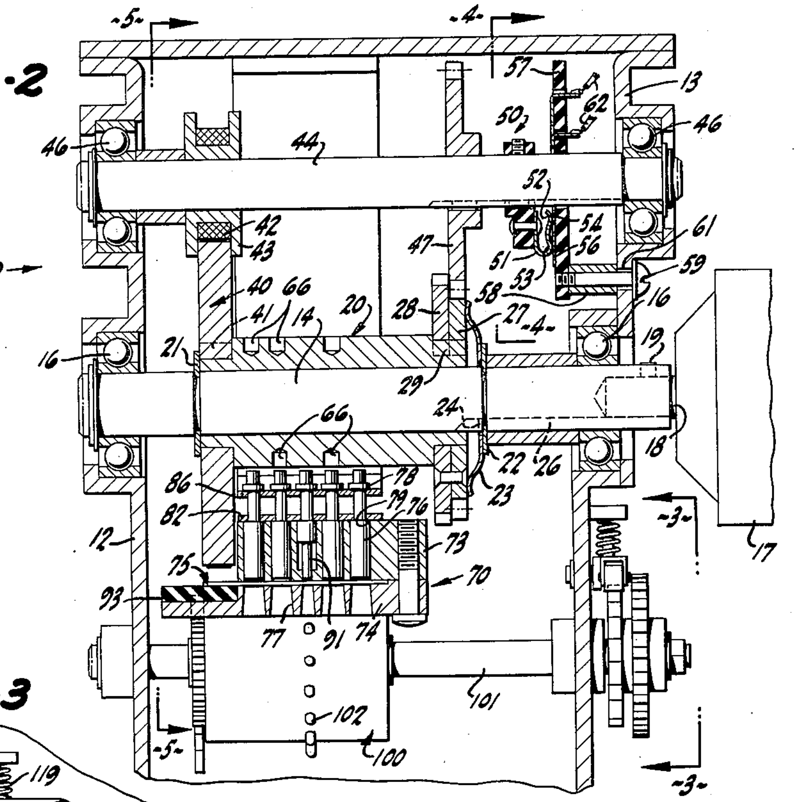
FIG. 2 is a sectional view, taken on line 2—2 of FIG. 1.
Figure 3:
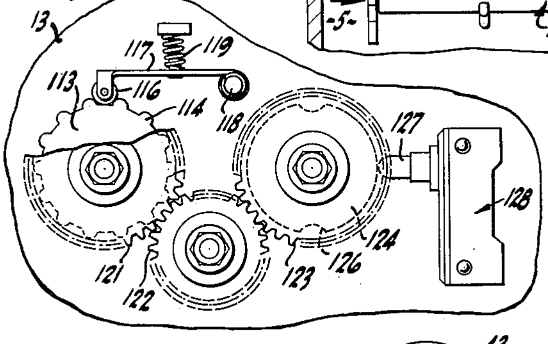
FIG. 3 is an elevational detail as seen from line 3—3 of FIG. 2.

A tape carrier unit 70 is disposed below the code cylinder 20 and is mounted on lever 71, for pivotal movement about shaft 72 carried by the frame. The tape carrier comprises upper and lower block members 73 and 74 bolted together so as to leave a tape slot therebetween for reception of a continuous tape 75. The upper block 73 has a plurality of vertical bores therethrough in which punch members 76 are vertically reciprocable. The lower block 74 has a plurality of tapered bores 77 therethrough in alignment with the punch members 76. As will be seen in FIGS. 1 and 2, each punch member 76 has an upper portion thereof flattened on each side thereof to form upper and lower shoulders 78 and 79. A stripper plate 81, mounted on the upper block 73, has a plurality of fingers 82 embracing the flattened portion of the punch members above the lower shoulders 79 thereof. Similarly, an upper stripper plate 83, fixed to bracket 84 mounted on frame 11, has a plurality of fingers 86 embracing the flattened portion of the punch members below the upper shoulders 78 thereof.

The tape 75 is punched in the following manner. When the punch magnet 87 is energized, the core piece 88 thereof will attract lever 71, thus moving it in a clockwise direction (as seen in FIG. 1) about shaft 72, which movement causes the punch members 76 to be carried upwardly. When the code cylinder 20 is latched against rotation by latch 33, a row of code recesses 66 will be in axial alignment with the punch members 76. If there is a punch recess in alignment with a particular punch member, the punch member is free to and will enter thereinto without punching a hole in tape 75. However, if there is no punch recess, then the punch member will engage the code cylinder while the tape carrier continues to move upwardly, thus forcing the punch member to punch through the tape to form one of the coded holes 89 therethrough. In other words, whenever a punch recess is in the path of movement of a particular punch member, no hole will be punched in the tape, and, conversely, whenever a punch recess is not found in the path of movement, a punched hole will be made in the tape.

It will be noted that the central punch member 91 has a smaller diameter lower portion. This punch member is used to form the small tape feed holes 92 centrally of the tape. No punch recesses are found on the code cylinder in the path of movement of this punch member and, consequently, a tape feed hole will be punched on each punch coding operation.

As the tape carrier moves upwardly, it will bring the front portion of the tape 75 into contact with the printing indicia 67 on the printing wheel 40, so that a symbol is printed on the tape simultaneously with the punching thereof and in alignment with the punch holes. A resilient platen 93 is carried by the lower block 74 to cushion the impact on the printing wheel by the tape carrier.

On deenergization of the punch magnet, spring 94 will return lever 71 and tape carrier to their original positions. The punch members 76 will return therewith, or will be forced downwardly by the action of the stripper fingers 82 on the lower punch member shoulders 79. Similarly, the upper stripper fingers 86, acting on the upper punch member shoulders 78, will cause all the punch members to be raised above the tape 75 so as to be out of contact therewith.

A switch 95, having normally closed contacts 96 and 97, is positioned in the path of movement of lever 71 so that the contacts will be opened upon attractive movement of lever 71 towards punch magnet 87. These contacts will return to their normal closed position upon return movement of lever 71.

The tape advance mechanism comprises a drum 100 fixed on shaft 101, which is rotatably journaled in the front and rear walls 12 and 13. The drum 100 has a plurality of outwardly projecting pins 102 thereon engageable with the tape feed holes 92 of tape 75. A spring hold-down 103 is provided to press the tape 75 downwardly upon the upper surface of drum 100 with the pins 102 received with the tape feed holes 92.

Bracket 104, mounted on lever 71, has a pawl arm 106 pivotally mounted thereon at 107, and biased in a clockwise direction relative thereto by spring 108. As lever 71 pivots in a clockwise direction about shaft 72, the outer sloping cam surface 109 of the pawl rides over the ratchet teeth 111 fixed to drum 100. On return movement of lever 71, by spring 94, the pawl surface 112 engages a ratchet tooth 111 and pulls the drum in a counterclockwise direction. This in turn pulls the tape 75 to the left through the tape carrier 70.

A lobed cam 113 is fixed to the rear of shaft 101, and has a plurality of equally spaced apart cam lobes 114 thereon. A detent wheel 116 carried by lever arm 117 pivoted at 118 to the rear wall 13 and biased downwardly by spring 119 is utilized to insure that all counterclockwise rotative advances of the drum 100 are of equal amount so that the tape feed holes 92 will be equally spaced apart.

A gear 121, fixed to drum shaft 101, is in mesh with gear 122 which in turn meshes with gear 123. Both gears 122 and 123 are rotatably mounted on the rear wall 13. Gear 123 has a cam 124 fixed for rotation therewith. Cam 124 has two cam depressions 126 thereon into which the outwardly spring-biased contact arm 127 of microswitch 128 may ride. By suitable selection of the gear ratios between gears 121, 122 and 123, the contact arm 127 may move outwardly into a cam depression after a predetermined number of punching operations and tape advancing movements. The purpose of the microswitch 128 will be described hereinafter.

A back spacing mechanism 130 is provided, and comprises a lever 131 pivotally mounted at 132 and having a pawl member 133 thereon engageable with the drum ratchet teeth 111. When desired, the operator merely pushes down on the upwardly extending lever tab 134. This causes the lever 131 to pivot in a counterclockwise direction and causes the pawl 133 to engage a ratchet tooth 111 to rotate the drum 100 in a clockwise direction. The spring-pressed detent wheel 116 will hold the drum 100 in the proper position after back spacing.

Figure 7:
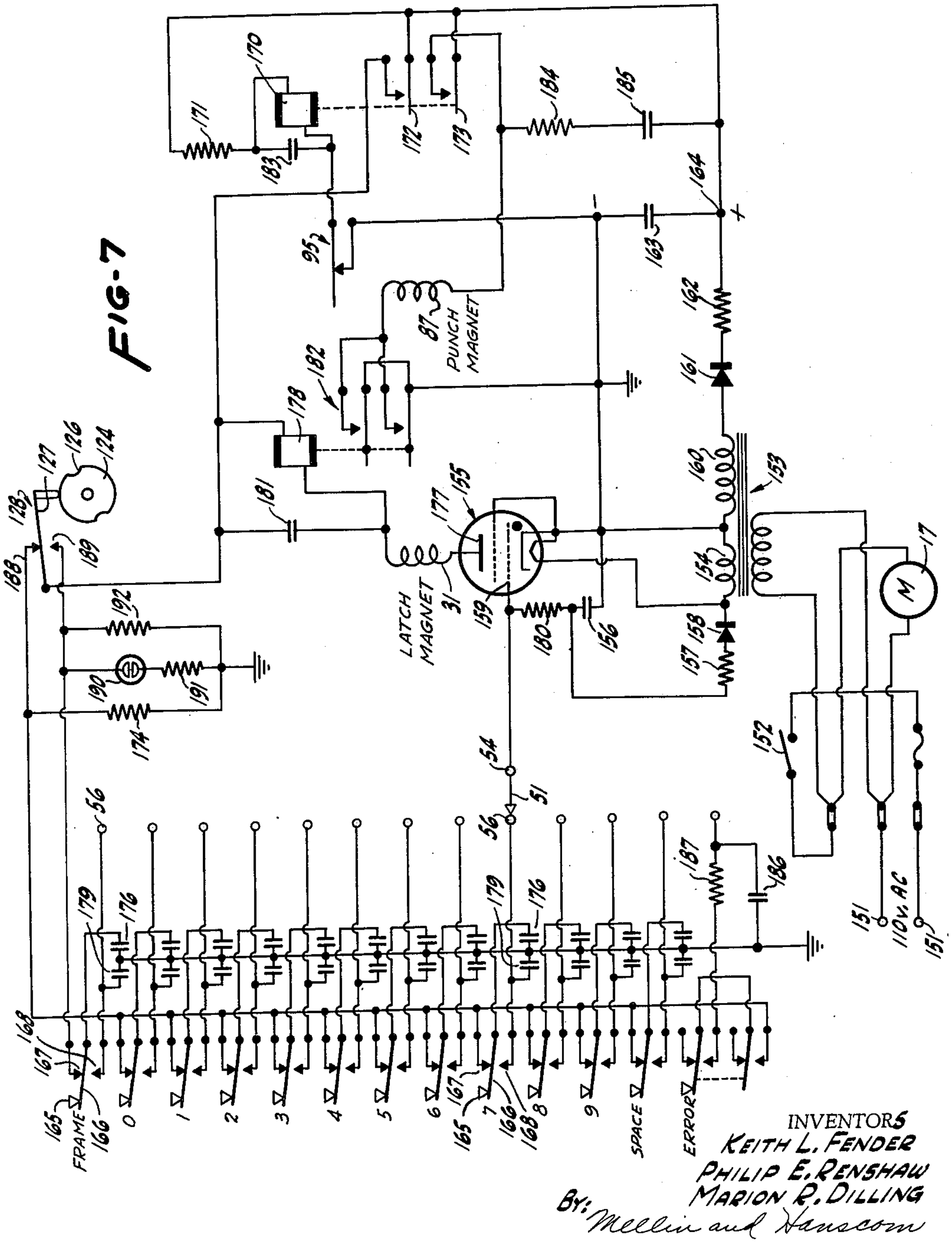
FIG. 7 is a circuit diagram of the electrical control circuit of this invention.

The operation of the machine is best considered in light of the control circuit illustrated in FIG. 7, taken in conjunction with the foregoing description.

Terminals 151 are provided for connection to a suitable alternating voltage source. When switch 152 is closed, the motor 17 is energized to continuously drive the code cylinder shaft 14. At the same time, the primary of power transformer 153 is energized. A first secondary winding 154 supplies voltage for the filament of the thyratron 155, and through a conventional rectifier circuit comprising capacitor 156, resistor 157 and selenium rectifier 158 supplies a negative bias to the thyratron grid 159. The circuit including the secondary transformer winding 160, selenium rectifier 161, resistor 162 and capacitor 163 provides a rectified high voltage for the circuit at terminal 164.

A plurality of manually operable keys 165 are disposed on a suitable keyboard (not illustrated) and are connected to the movable switch arms 166. These arms are normally biased into engagement with contacts 167 and, upon manual depression of the keys 165, will engage contacts 168. Each of the above key operated switches is identical to one another, except for the "Errror" key which operates two ganged together switches, as will be described hereinafter.

Again, with the main switch 152 closed, and before any of the keys 164 are depressed, switch 95 is normally closed, and completes a circuit from ground through switch 95, relay coil 170 and resistor 171 to the high voltage terminal 164.

The energization of relay 170 closes the normally open contacts 172 and 173 associated therewith, to complete a circuit from ground through resistor 174, frame switch 128 (microswitch 128) and contacts 172 to the high voltage terminal, which places full voltage across resistor 174. It will be noted that all of the capacitors 176 are connected by the normally closed key operated contacts 166 and 167 in parallel with resistor 174, and thus all of these capacitors will be charged to the power supply voltage.

The closure of relay contacts 172 also connects the plate 177 of thyratron 155 through the latch magnet coil 31 and relay coil 178 to the high voltage terminal 164. The thyratron will not conduct, however, because of the negative grid bias thereon.

It wil be noted that each contact 168 of the key operated switches is connected to one of the contact segments 56 of the brush contact plate 57, and that the common ring contact 54 thereof is connected to the grid 159 of the thyratron. With the motor 17 in operation, and with the latch magnet 31 deenergized, the brush 51 will sweep across each of the contact segments 56 in turn.

Let it be assumed that it is desired to print and punch the number "7" on the tape. The operator depresses the "7" key 165 to close the switch arm 166 against contact 168. The charge on capacitor 176 is then impressed on capacitor 179 which is now connected thereto. This occurs practically instantaneously, and the key may be released immediately. The charge on capacitor 179 now appears at the contact segment 56.

When the brush 51 next bridges the brush contacts 54 and 56 (as illustrated in FIG. 7), the capacitor 179 will discharge through resistor 180 to raise the grid voltage on the thyratron sufficiently positive to cause the tube to conduct.

The plate current of the tube energizes the latch magnet 31 to cause the code cylinder to be latched against rotation, with the row of coded punch recesses corresponding to the number "7" being axially aligned with the punch members. Capacitor 181, in the plate circuit of the thyratron, enables the latch magnet 31 to be quickly energized.

Very shortly thereafter, due to the delay induced by capacitor 181, relay coil 178 is energized to close the normally open contacts 182 associated therewith. This completes the circuit through the punch magnet coil 87, to initiate the punching and printing operations, as described above.

At the end of the punch stroke of lever 71, the normally closed switch 95 will be opened, thus breaking the circuit to relay coil 170. After a short time delay caused by capacitor 183 in parallel therewith, relay coil 170 will deenergize to open the contacts 172 and 173 thereof. The opening of contact 172 will break the plate circuit of the thyratron, causing the tube to extinguish and the relay coil 178 and latch magnet 31 to be deenergized, while the opening of contacts 173 will cause the punch magnet coil 87 to be deenergized. Resistor 184 and capacitor 185 across the contacts 173 provide for spark suppression thereat.

As has been mentioned above, the return of the lever 71 to its original position advances the tape and allows switch 95 to be reclosed so that another printing and punching operation may be performed. An important advantage of the invention is that the tape is advanced after a printing and punching operation sufficiently far so that the printed and punched portion of the tape is clear of the tape carrier, thus enabling an operator to see immediately if an error has been made before any more coding operations are performed. As is evident, this is much more convenient than if many coding operations had to be performed before the first operation on the tape becomes visible.

It will be noted that only a single punching operation will be carried out, even though the "7" key is continuously held down, since, if so held down, the charge on both capacitors 176 and 179 will bleed off through resistor 180, and the next time that the brush 51 contacts the contact segment 56 associated with the "7" key, there will not be a sufficiently positive voltage thereon to fire the thyratron. Accordingly, a key must be depressed each time to initiate a punching cycle, and a single cycle only will result from a single depression of a key.

There is one exception to this; namely, in the operation of the "Error" key. In this instance, it is desirable at times to punch an error indication several times in succession. When the "Error" key is depressed, it will complete a charging circuit through capacitor 186 and resistor 187, which are connected to the high voltage terminal 164, so that a positive voltage appears on the brush contact segment 56 associated therewith. This causes the thyratron to fire when the brush 51 engages the "Error" brush contact segment and to perform a punching and printing cycle as above. Now, however, if the "Error" key remains depressed, the charging circuit again places a positive voltage on the brush contact to start another operation when the brush 51 again comes in contact therewith. Thus, the tape will be repeatedly punched and printed with an "Error" indicia until the "Error" key is released.

The particular control circuit of FIG. 7 also provides automatic means for frame punching and printing of the tape 75. That is, after a predetermined number of punching operations, constituting a "frame," have been performed, the machine will not punch and print any further information until a "frame" indicia is punched and printed on the tape, thus enabling the information thereon to be divided into groups of predetermined numbers of bits.

As has been described above, the frame cam 124 rotates with the tape advance drum, and after a predetermined number of tape advances, the microswitch arm 127 will enter a depression 126 on the cam, causing microswitch 175 to open switch cam 127 and contact 188 and to close switch arm 127 and contact 189.

The opening of switch arm 127 and contact 188 breaks the charging path for capacitors 176 and the charges thereon bleed off through resistor 174. With these capacitors discharged, the depression of the keys will not place a positive voltage on the thyratron grid and no punching cycle can take place.

The closing of switch arm 127 and contact 189 connects the neon indicating lamp 190 and current limiting resistor 191 to the high voltage terminal 164, causing the lamp to light to indicate to the operator that the end of a frame has occurred. At the same time, capacitor 176 associated with the "Frame" key 164 is enabled to be charged to the power supply voltage. Depression of the "Frame" key then indicates a printing and punching cycle of operation in the same manner as above described. The tape advance occurring after this cycle of operation will rotate the frame cam 124 to open the microswitch switch arm 127 and contact 189 and to reclose the switch arm 127 and contact 188 thereof so that new information may be entered. The frame capacitor 176 will discharge through resistor 192.

Referring again to the operation of the "Error" key, when an error is made in a frame of information, the "Error" key may be depressed and held down and the error indicia will be repeatedly printed and punched on the tape for the remainder of the frame, at which time the "Error" key will be automatically deactivated.

If desired, the above described frame operation can be disabled by disabling the operation of the microswitch so that a circuit is maintained between switch arm 127 and contact 188 thereof at all times.

FIG. 6 illustrates a section of tape as punched and printed by the apparatus of the present invention. As will be seen, the tape is code punched in binary manner, with the information holes 89 each representing the ordinals 1, 2, 4 and 8 according to the position thereof relative to the central tape feed holes 92. Also, each row of holes has printed thereon a visual indicia corresponding to the punched holes so that a visual check may be easily made without having to mentally translate the punched information into what it represents. The "frame" and "error" bits of information are indicated on the tape by the "F" and "E" printed symbols, and by the punched holes corresponding to the binary representation of the numbers 13 and 15, respectively. In addition, a "space" is represented on the tape by the printed symbol "S" and the punched holes corresponding to the binary representation of the number "14." It is, of course, to be realized that the particular code configuration illustrated is merely exemplary, and that any other code could be used, as desired. Also, it is obvious that the code cylinder could be made wider or narrower to accommodate more or less numbers of punch holes, and that the longitudinal rows thereof can be made more or less in number on the code cylinder. However, it is important that the printing wheel indicia be made in indicia correspondence to the code represented holes punched in the tape so that a visual reading of the symbol represented by the holes may be made.

It is to be further realized that the invention herein illustrated and described is to be taken as a preferred embodiment of the same, and that various changes in the shape, size and arrangement of parts may be resorted to without departing from the spirit of the invention or the scope of the attached claims.

We claim:

1. A tape printing and punching mechanism comprising a frame, a continuously rotating shaft journaled in said frame, a code cylinder mounted on said shaft for free rotation, friction drive means coupling said shaft and cylinder together, a tape carrier mounted on said frame in operative relation to said code cylinder, said code cylinder having a plurality of longitudinal rows of first hole-forming means, the configuration of each row of said first hole-forming means corresponding to a predetermined code, a plurality of manually operable switches one for each of said rows of first hole-forming means, a ratchet wheel fixed for rotation with said code cylinder and having a number of teeth thereon corresponding to the number of said rows of first hole-forming means, electrically energizable latch means engageable with a selected one of said teeth to prevent rotation of said code cylinder by said shaft, means responsive to actuation of one of said switches to energize said latch means to latch said code cylinder against rotation with the row of said first hole-forming means corresponding to said selected switch being adjacent said tape carrier, means responsive to the operation of said selected switch for relatively moving said code cylinder and tape carrier towards each other, second hole-forming means carried by said tape carrier and cooperable with said first hole-forming means for forming code holes in a tape carried by said tape carrier corresponding to the code of the first hole-forming means when said code cylinder and tape carrier are moved towards one another, a plurality of printing indicia fixed to said code cylinder in longitudinal alignment with each row of said first hole-forming means and being in indicia correspondence therewith, and means for forming a visual representation on a tape carried by said tape carrier by the printing indicia as said first and second hole-forming means form holes in said tape.

2. A tape printing and punching mechanism comprising a frame, a continuously rotating shaft journaled in said frame, a code cylinder mounted on said shaft for free rotation, friction drive means coupling said shaft and cylinder together, a tape carrier mounted on said frame in operative relation to said code cylinder, said code cylinder having a plurality of longitudinal rows of first hole-forming means, the configuration of each row of said first hole-forming means corresponding to a predetermined code, a plurality of manually operable switches one for each of said rows of first hole-forming means, a ratchet wheel fixed for rotation with said code cylinder and having a number of teeth thereon corresponding to the number of said rows of first hole-forming means, electrically energizable latch means engageable with said teeth to prevent rotation of said code cylinder by said shaft, a brush member rotatable with said code cylinder, a plurality of brush contacts engageable by said brush member and being of a number corresponding to the number of said rows of first hole-forming means, electrical circuit means connecting each of said contacts with one side of said switches, and electrical circuit means connecting the other sides of said switches in series with said latch means and said brush so that actuation of a selected switch will complete an electrical circuit through a selected brush contact, brush and latch means to latch said code cylinder against rotation with the row of said first hole-forming means corresponding to said selected switch being adjacent said tape carrier, means responsive to the operation of said selected switch for relatively moving said code cylinder and tape carrier towards each other, second hole-forming means carried by said tape carrier and cooperable with said first hole-forming means for forming code holes in a tape carried by said tape carrier corresponding to the code of the first hole-forming means when said code cylinder and tape carrier are moved towards each other, a plurality of printing indicia fixed to said code cylinder in longitudinal alignment with each row of said first hole-forming means and being in indicia correspondence therewith, and means for forming a visual representation on a tape carried by said tape carrier by the printing indicia as said first and second hole-forming means form holes in said tape.

3. A device as set forth in claim 2 further including means responsive to the operation of said selected switch for advancing said tape in said tape carrier after the code punching and printing thereof.

4. A tape coding mechanism comprising a frame, a continuously rotating shaft journaled in said frame, a code cylinder mounted on said shaft for free rotation, friction drive means coupling said shaft and cylinder together, means for holding a tape tangentially to said code cylinder at a code-forming position relative thereto, said code cylinder having a plurality of coding means spaced peripherally around said code cylinder, the configuration of each of said coding means corresponding to a predetermined code, a plurality of manually operable switches one for each of said coding means, a ratchet fixed for rotation with said code cylinder and having a tooth thereon corresponding to each of said coding means, electrically energizable latch means engageable with a selected one of the ratchet teeth to prevent rotation of said code cylinder by said shaft, and means responsive to actuation of one of said switches to energize said latch means to latch said code cylinder against rotation with the coding means corresponding to said selected switch being at said code-forming position adjacent said tape.

5. A tape printing and punching mechanism comprising a frame, a continuously rotating shaft journaled in said frame, a code cylinder mounted on said shaft for free rotation, friction drive means coupling said shaft and cylinder together, means for holding a tape tangentially to said code cylinder at a code-forming position relative thereto, said code cylinder having a plurality of hole-forming means spaced peripherally thereof, the configuration of each of said hole-forming means corresponding to a predetermined code, a plurality of manually operable switches one for each of said hole-forming means, a ratchet fixed for rotation with said code cylinder and having a tooth thereon corresponding to each of said hole-forming means, electrically energizable latch means engageable with a selected one of the ratchet teeth to prevent rotation of said code cylinder by said shaft, means responsive to actuation of one of said switches to energize said latch means to latch said code cylinder against rotation with the hole-forming means corresponding to said selected switch being at said code-forming position adjacent said tape, and a plurality of printing indicia fixed to said code cylinder in longitudinal alignment with each of said hole-forming means and being in indicia correspondence therewith.

6. A tape punching mechanism comprising a frame, a continuously rotating shaft journaled in said frame, a code cylinder mounted on said shaft for free rotation, friction drive means coupling said shaft and cylinder together, a tape carrier mounted on said frame in operative relation to said code cylinder for holding a tape in position to have a portion thereof punched, said code cylinder having a plurality of longitudinal rows of hole-forming means, the configuration of each row of said hole-forming means corresponding to a predetermined code, a plurality of manually operable switches one for each of said rows of hole-forming means, a ratchet fixed for rotation with said code cylinder and having a number of teeth thereon corresponding to the number of said rows of hole-forming means, electrically energizable latch means engageable with a selected one of said teeth to prevent rotation of said code cylinder by said shaft, and means responsive to actuation of one of said switches for energizing said latch means to latch said code cylinder against rotation with the row of said hole-forming means corresponding to said selected switch being adjacent the portion of the tape to be punched.

References Cited in the file of this patent

UNITED STATES PATENTS

| | | |
|---|---|---|
| 433,003 | Hill | July 29, 1890 |
| 734,576 | La Garde | July 28, 1903 |
| 748,421 | Robertson | Dec. 29, 1903 |
| 1,018,519 | Potts | Feb. 27, 1912 |
| 1,476,272 | Swanson | Dec. 4, 1923 |
| 2,002,437 | Maul | May 21, 1935 |
| 2,189,027 | Fuller | Feb. 6, 1940 |
| 2,278,118 | Pitman | Mar. 31, 1942 |
| 2,554,707 | Johnson | May 29, 1951 |
| 2,708,873 | Braun | May 24, 1955 |
| 2,723,719 | Mantonya | Nov. 15, 1955 |
| 2,754,751 | Marsh | July 17, 1956 |